US009342065B2

(12) United States Patent
Nonaka et al.

(10) Patent No.: US 9,342,065 B2
(45) Date of Patent: May 17, 2016

(54) PATH INTERFERENCE AND GENERATION DEVICE AND METHOD

(71) Applicant: HITACHI, LTD., Tokyo (JP)

(72) Inventors: Yoichi Nonaka, Yokohama (JP); Hisaya Ishibashi, Yokohama (JP); Takahiro Nakano, Fujisawa (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/816,177

(22) Filed: Aug. 3, 2015

(65) Prior Publication Data
US 2015/0338840 A1 Nov. 26, 2015

Related U.S. Application Data

(63) Continuation of application No. 13/520,188, filed as application No. PCT/JP2011/051629 on Jan. 27, 2011, now Pat. No. 9,134,723.

(30) Foreign Application Priority Data

Feb. 5, 2010 (JP) ................ 2010-024360

(51) Int. Cl.
G05B 19/19 (2006.01)
G05B 19/4069 (2006.01)

(52) U.S. Cl.
CPC ............ *G05B 19/19* (2013.01); *G05B 19/4069* (2013.01); *G05B 2219/35097* (2013.01); *G05B 2219/35324* (2013.01); *G05B 2219/35348* (2013.01); *G05B 2219/4704* (2013.01); *Y02P 90/265* (2015.11)

(58) Field of Classification Search
None
See application file for complete search history.

(56) References Cited

U.S. PATENT DOCUMENTS

| 4,633,409 A | 12/1986 | Sekikawa |
| 5,122,966 A | 6/1992 | Jansen et al. |
| 2005/0049749 A1 | 3/2005 | Watanabe et al. |

FOREIGN PATENT DOCUMENTS

| JP | 61-203251 A | 9/1986 |
| JP | 5-341832 A | 12/1993 |
| JP | 2007-172300 A | 7/2007 |
| JP | 2009-134542 A | 6/2009 |

OTHER PUBLICATIONS

Jun'ichi Kaneko et al., Fast Generation Method of Tool Posture for 5-Axis Control Machining—Detection of Interference between workpiece surface and cutting tool—, Proceedings of Saitama University, Engineering Department, 2006, p. 93-96, No. 39.
Mahadevan Balasubramaniam et al., Generation of collision-free 5-axis tool paths using a haptic surface, Computer-Aided Design, Apr. 2002, pp. 267-279, vol. 34, Issue 4.

*Primary Examiner* — Kenneth M Lo
*Assistant Examiner* — Geoffrey Wellman
(74) *Attorney, Agent, or Firm* — Baker Botts L.L.P.

(57) ABSTRACT

In devices for generating a path of a tool of a processing machine by way of computer simulation, an NC program is created using a generated processing path. The NC program used to be corrected by verification of actually moving the processing machine. In contrast, the disclosed processing path generation device has been constituted to be provided with a means for calculating a closest distance and direction from a relationship of a position and posture between a tool and a work at an arbitrary point upon the processing path; a means for imparting a color determined by the closest distance and the direction calculated at the point upon the processing path; a means for panoramically displaying the color imparted to the work; and a means for correcting the relationship of the a position and posture between the tool and the work on the basis of information from a display device.

10 Claims, 15 Drawing Sheets

PATH INTERFERENCE AND GENERATION DEVICE AND METHOD

CROSS REFERENCE TO PRIOR APPLICATIONS

This application is a continuation of U.S. patent application Ser. No. 13/520,188, filed on Jul. 2, 2012, which is a U.S. National Phase application under 35 U.S.C. §371 of International Patent Application No. PCT/JP2011/051629, filed on Jan. 27, 2011 and claims benefit of priority to Japanese Patent Application No. 2010-024360, filed on Feb. 5, 2010. The International Application was published in Japanese on Aug. 11, 2011 as WO 2011/096327 A1 under PCT Article 21(2). The contents of the above applications are hereby incorporated by reference.

TECHNICAL FIELD

The present invention relates to a technical field for generation of a tool path by checking interference with a device, a tool, a work and the like by means of a computer, which allows a CNC (numerical control apparatus) to execute processing. More specifically, the present invention relates to a technical field of CAM (Computer Aided Manufacturing) for evaluation of interference check upon generation of the tool path.

BACKGROUND ART

When processing the work, using a device, for an engine and an impeller, which has many narrow portions and curved surfaces, it is necessary to appropriately design a processing path of the tool so as to prevent the device and the tool from interfering with the work. Recently, CAM technique has been employed for designing the processing path by modeling the device, the tool and the work preliminarily in the computer as three-dimensional models using computer simulation technique before processing, and changing a position and posture of the tool model with respect to the computer models of the device and the work along the processing path so as to calculate as needed whether the interference occurs between the models.

For example, FIG. 1 illustrates that an impeller 102 as the work is subjected to cutting work by a 5-axis CNC machining device 101. In this state, a tool 103 is required to cut the curved surface while getting into a narrow portion of the impeller 102 where blades are overlapped. It is therefore necessary to generate the path of the tool 103 so as to protect the impeller 102 from interference of the portion of the tool 103 other than a blade edge and the device 101. In this processing path generation, the processing path is generated on the CAM device, and thereafter, an operator checks whether there is the interference on the processing path in reference to computer graphics of the CAM device. If the interference is found, the operator corrects posture and path of the tool based on experience and intuition, and resumes the interference check repeatedly.

Following cases will be described as related art. Patent Literature 1 proposes the method for improvement of display with respect to interference on the processing path of the CAM device. Specifically, the part of the tool is classified into the one for processing in contact with the work, for example, a blade edge, and the one not for processing. If the interference with the work occurs at the part of the tool, which is not used for the processing, the display color of the CAM device will be changed to allow easy identification of the interference state. The display color of a trajectory of the tool on the work is made different from that of the work so as to further allow easy identification of the specific point on the processing path where the interference has occurred.

Patent Literature 2 proposes the method for high speed interference check in the CAM device. Specifically, the device, tool and work are converted into graphic data, respectively by the CAM device. Unlike the interference check operation performed by image processing for the respective graphic data to determine whether there is an overlap of the processed graphic data, the interference check is performed through logical operation after converting the graphic data into serial signals, thus establishing high speed operation.

Non-patent Literature 1 proposes the method for improvement of display of the part of the industrial tool on the processing path where the interference occurs in the CAM device. Specifically, the processable region and the non-processable region are graphically illustrated in configuration space of the tool, which is defined by the tool feed direction and the normal direction at a point in contact with the work. The direction of the tool where the interference with the work occurs in the non-processable region is color displayed so as to ensure easy identification of the interference state.

For the color display of the interference direction, when the processing surface of the work is geometrically expanded to the center of the tool, the expanded surface that interrupts the line of sight radially extending from the center of the tool is regarded as the interference. The color imparted to the line of sight is mapped in the tool configuration space as the color representative of the interference state so as to allow determination with respect to direction of the tool in which the interference with the work occurs in the non-processable region based on the color.

Non-patent Literature 2 proposes the method of generating the processing path in the CAM device, which avoids the interference in accordance with the operator's instruction as needed. Specifically, the mechanism is provided to allow the operator to operate a multilinked manipulator added to the CAM device so as to adjust posture and position of the tool in the CAM device. A force sensor is added to the manipulator, which executes a force feedback to limit the work range of the manipulator so that the tool is no longer advanced toward the interfering direction where the tool has interfered with the device and the work in the CAM device, and the operator is notified of the interference state. The color of the region of the work surface in the CAM device, which is processed by the manipulation is changed to a different color to assist generation of the processing path.

CITATION LIST

Patent Literature

Patent Literature 1: Japanese Patent Application Laid-Open Publication No. 61-203251
Patent Literature 2: Japanese Patent Application Laid-Open Publication No. 05-341832

Non-Patent Literature

Non-patent Literature 1: J. Kaneko and K. Horio, "Fast Generation Method of Tool Posture for 5-Axis Control Machining—Detection of Interference between workpiece surface and cutting tool—", Proceedings of Saitama University, Engineering Department, No. 39 (2006): p. 93
Non-patent Literature 2: Generation of collision-free 5-axis tool paths using a haptic surface Mahadevan Balasubramaniama, Stephen Hoa, Sanjay Sarma, and Yoshitaka Adachi, a Department of Mechanical Engineering, Massachusetts Institute of Technology, Cambridge, Mass. 02139, USA, Suzuki Motor Corporation, R&D Center, Yokohama 224-0046, Japan, Computer-Aided Design, Volume 34, Issue 4, 1 Apr. 2002, Pages 267-279

SUMMARY OF INVENTION

Technical Problem

The aforementioned related art allows identification of the interference state of the tool such as the device and the tool with the work. However, there is a problem that it is difficult to easily identify as to how severe the clearance between the tool and the work is and how they are directed on the processing path. Actually, the NC program is made using the generated processing path to actually operate the device, and the clearance is checked as needed before occurrence of the interference. The NC program is corrected while adjusting the posture and path of the tool as needed, resulting in the problem of increase in the number of steps of generating the NC program.

For example, Patent Literature 1 discloses that the CAM device allows easy identification of the portion where the interference of the tool with the work occurs by displaying the specific color. However, the clearance before occurrence of the interference cannot be identified as needed. Patent Literature 2 discloses the high-speed interference checking in the CAM device, but does not disclose the method of calculating the clearance before occurrence of the interference. Non-patent Literature 1 describes that the direction in which the clearance becomes severe is color displayed in the configuration space of the tool. However, the clearance of the portion other than the tool, for example, the tool holder, the arm portion of the device and the base of the device cannot be identified as needed. Non-patent Literature 2 allows identification of the interference state of the tool with the work through the force sensing feedback of the manipulator that teaches the interference state of the tool with the work in the CAM device. However, the clearance before occurrence of the interference cannot be identified as needed.

That is, the aforementioned related art has the problem of lack of information for correcting the posture and the processing path of the tool before occurrence of the interference although it is possible to check whether the interference on the processing path exists or not on the CAM device. The processing path is corrected based on a result of the interference, and the interference check is performed repeatedly. This may cause the problem of deteriorating manufacturing efficiency.

Solution to Problem

The present invention for solution of the problem provides a processing path generation device that generates a path of a tool by calculating a positional and attitudinal relationship between a device of an NC processing machine and the tool such as an industrial tool, and a work through simulation executed by a computer, which is provided with closest distance calculation means that calculates a closest distance between the tool and the work at an arbitrary point on the tool path, color/texture imparting means that imparts a different color or a different texture in accordance with a distance and a direction of the work from the tool based on a result of calculation performed by the closest distance calculation means, and display means that displays the color or the texture imparted by the color/texture imparting means on a screen as the color or the texture at a point on the tool path based on the result of calculation performed by the closest distance calculation means.

The present invention for solution of the problem provides a processing path generation device that generates a path of a tool by calculating a positional and attitudinal relationship between a device of an NC processing machine and the tool such as an industrial tool, and a work through simulation executed by a computer, which is provided with closest distance calculation means that calculates a closest distance between the tool and the work at an arbitrary point on the tool path, scoring means that awards a score in accordance with a distance and a direction of the work from the tool based on a result of calculation performed by the closest distance calculation means, score totaling means that totals the score determined by the scoring means as a score at a point on the tool path based on the result of calculation performed by the closest distance calculation means to set a score of the path, and display means that displays a list of the total scores of a plurality of patterns each having processing direction of the work and the tool posture changed, which have been obtained through the closest distance calculation means, the scoring means and the score totaling means.

The present invention for solution of the problem provides a processing path generation method that generates a path of a tool by calculating a positional and attitudinal relationship between a device of an NC processing machine and the tool such as an industrial tool, and a work through simulation executed by a computer, which calculates a closest distance between the tool and the work at an arbitrary point on the tool path, imparts a different color or a different texture in accordance with a distance and a direction of the work from the tool based on a result of the calculation, and displays the imparted color or the imparted texture on a screen as the color or the texture at a point on the tool path based on the result of the calculation.

The present invention for solution of the problem provides a processing path generation method that generates a path of a tool by calculating a positional and attitudinal relationship between a device of an NC processing machine and the tool such as an industrial tool, and a work through simulation executed by a computer, which calculates a closest distance between the tool and the work at an arbitrary point on the tool path, awards a score in accordance with a distance and a direction of the work from the tool based on a result of the calculation, totals the awarded score based on the calculation result as a score at a point on the tool path to set a score of the path, executes processes of calculating the closest distance, awarding the score, and totaling the score to set the score of the path for a plurality of patterns each having processing direction of the work and the tool posture changed, and displays a list of the total scores of the plurality of patterns each having processing direction of the work and the tool posture changed, which have been obtained through execution of the processes.

Advantageous Effects of Invention

The present invention allows panoramic identification of the clearance between the tool or processing machine and the part over the whole processing region, and design of the processing path while preliminarily adjusting the posture and path of the tool in reference to the direction of the severe clearance as needed on the CAM device. This makes it possible to generate the appropriate processing path for a short period of time without performing the generally employed operation by repeating correction of the processing path based on a result of the interference and interference checking, thus contributing to manufacturing efficiency.

DESCRIPTION OF EMBODIMENTS

Figure 1:
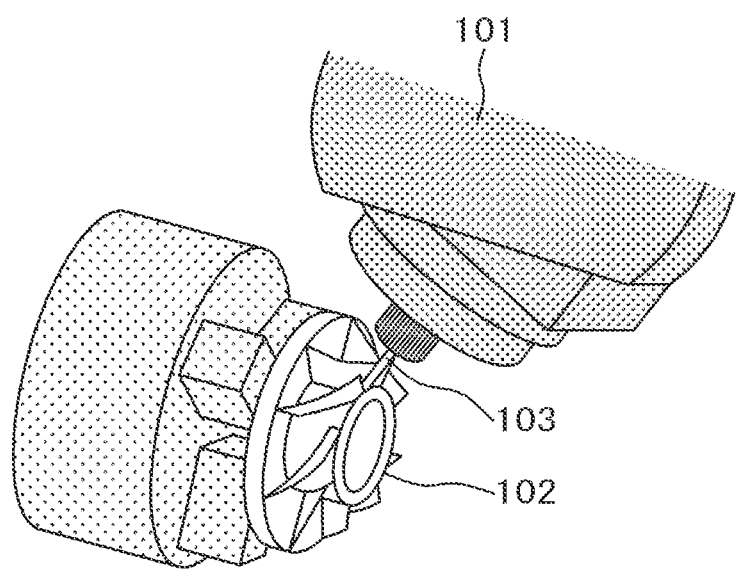
FIG. 1 is a perspective view of an impeller (work) and an industrial tool (tool) for cutting of the impeller using a 5-axis CNC machining device.

An embodiment of the present invention will be described referring to the drawings.

Figure 2A:
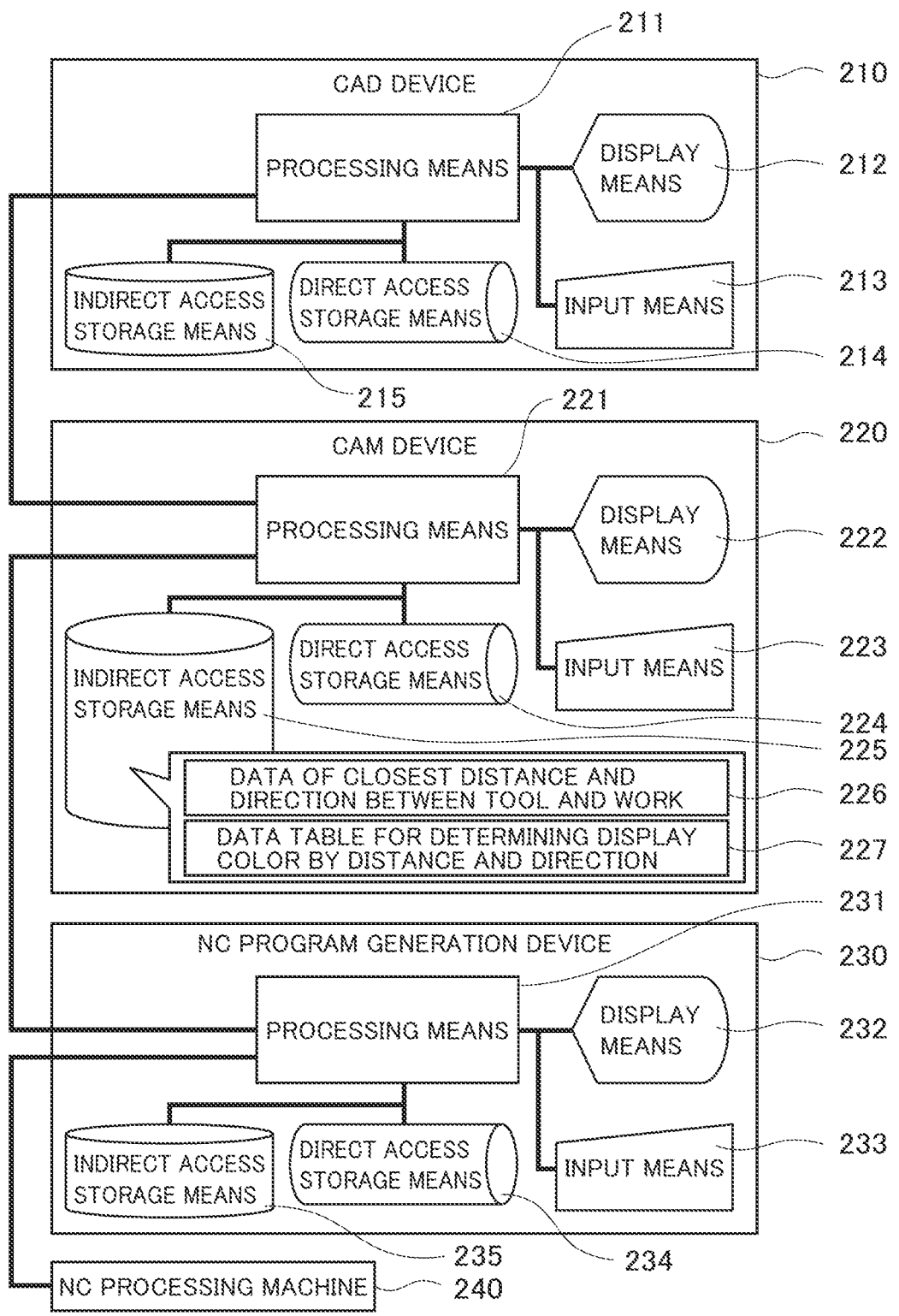
FIG. 2A is a block diagram of a structure formed by combining a CAD device, a CAM device, an NC program generation device and an NC processing machine.

FIG. 2A schematically shows a structure of the NC processing system to which the present invention has been applied.

The NC processing system includes a CAD device 210, a CAM device 220, an NC program generation device 230, and an NC processing machine 240.

The CAD device 210, the CAM device 220 and the NC program generation device 230 are provided with processing means 211, 221 and 231, display means 212, 222 and 232, input means 213, 223 and 233, direct access storage means 214, 224 and 234, and indirect access storage means 215, 225 and 235, respectively.

The processing means 211, 221 and 231 serves to perform the mathematical operation such as a central processing unit or CPU. The direct access storage means 214, 224 and 234 as the means that allows memory access at the speed equivalent to an internal processing speed of the processing means 211, 221 and 231 may be formed as a cache memory for the processing means 211, 221 and 231, or memory means such as a DRAM. The indirect access storage means 215, 225 and 235 as the means that allows memory access at the speed different from the internal processing speed of the processing means 211, 221 and 231 may be formed as such medium as a hard disk, an optical disk and a magnetic tape, or the hard disk, the optical disk, the magnetic tape and the DRAM in the other computer via internet/intranet. The display means 212, 222 and 232 denotes visual display means such as means for display and printing. The input means 213, 223 and 233 denotes the means for inputting all the information except the one from the direct access storage means 214, 224 and 234, and the indirect access storage means 215, 225 and 235 to the processing means 211, 221 and 231, for example, a keyboard, a mouse, a digitizer, and a sensor.

The display means 212, 222 and 232, and the input means 213, 223 and 233 may be shared by the CAD device 210, the CAM device 220 and the NC program generation device 230.

The CAD device 210 allows the processing means 211 to generate calculation models that represent three-dimensional configurations of the tool and the work used by the NC processing machine 240, and the calculation model that represents the three-dimensional configuration of the NC processing machine 240 by itself.

The CAM device 220 obtains the calculation models generated by the CAD device 210, which represent the three-dimensional configurations of the NC processing machine, the tool and the work, and generates the processing path of the tool for processing the work with the NC processing machine 240 based on the positional and attitudinal relationship among those calculation models. That is, the processing means 221 calculates the path of the tool that moves relative to the work based on the positional and attitudinal relationship among those calculation models when processing the work set in the NC processing machine using the tool. The interference check is conducted whether the portion of the tool other than the processing portion interferes with the work set in the NC processing machine, or the NC processing machine interferes with the work by calculating the interference state of the calculation model based on the positional and attitudinal relationship among the calculation models at an arbitrary point on the path.

Especially, the indirect access storage means 225 of the CAM device 220 includes, in order to perform the present invention, a data storage region 226 that stores data of the closest distance between the tool and the work, and the direction, and a data table 227 for determination of the display color based on the distance and direction. The data storage region 226 and the data table 227 are copied to the direct access storage means 224 as needed for usage and correction, and further stored in the indirect access storage means 225 as needed.

Figure 2B:
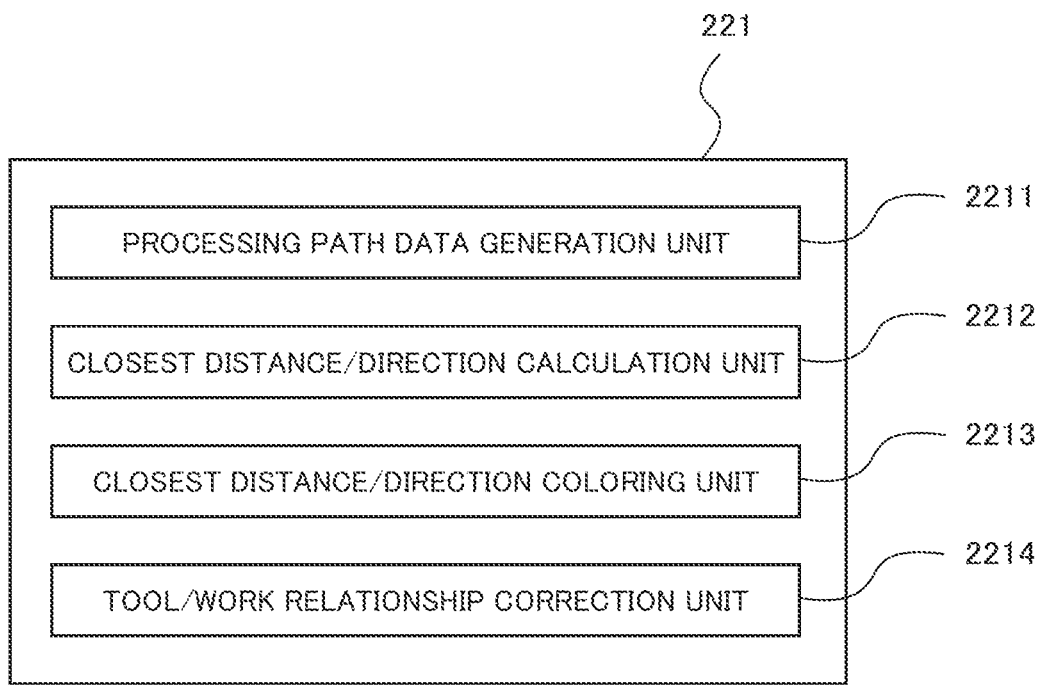
FIG. 2B is a block diagram showing a structure of processing means of the CAM device.

Referring to FIG. 2B, the processing means 221 of the CAM device 220 includes a processing path data generation unit 2211, a closest distance/direction calculation unit 2212, a closest distance/direction color setting unit 2213, and a tool/work relationship correction unit 2214.

The NC program generation device 230 generates the NC program so that the NC processing machine 240 performs the processing with the tool for the target work, which is imparted with a control command unique to the NC processing machine 240 using the processing path information generated by the CAM device 220.

An example of the processing system with the above-described structure will be described in detail hereinafter.

Figure 3:
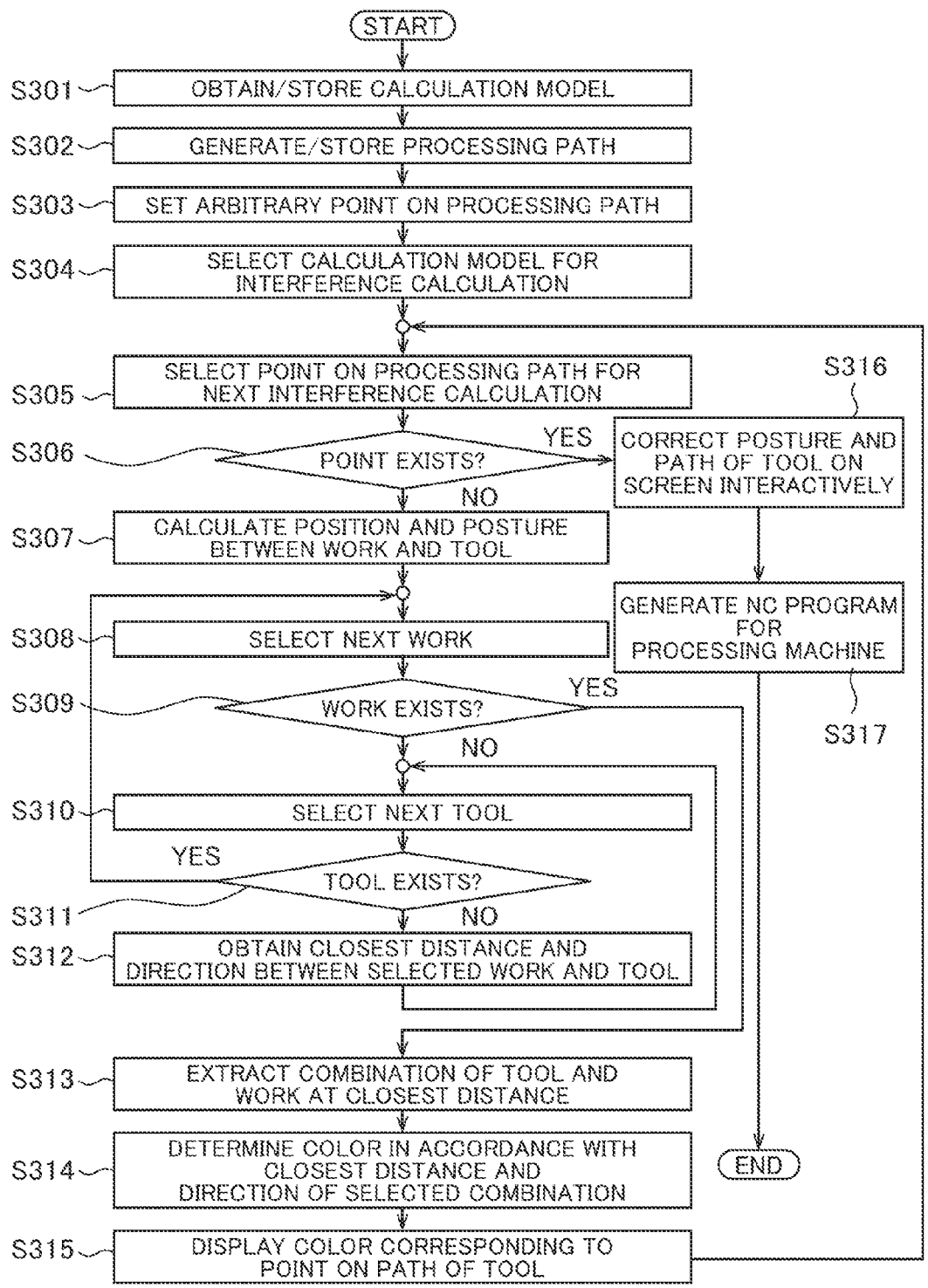
FIG. 3 is a flowchart representing process steps of generating the tool path according to an embodiment.

FIG. 3 represents process steps executed by the CAM device 220 and the NC program generation device 230 when applying the embodiment to the system structure shown in FIG. 2A. This embodiment relates to a method and a device for generation of the NC program of the NC processing machine 240 by the NC program generation device 230 based on the process for sophistication of the function of the CAM device 220 as shown in FIG. 2A and results thereof. Specifically, processing performed by the structure shown in FIG. 1 through the process steps executed in the CAM device 220 will be described.

The CAM device 220 obtains calculation models that represent three-dimensional configurations of a portion 101 of the NC processing machine 240 around the part for holding the tool and the work, a tool 103, and a work 102 which have been preliminarily generated by the CAD device 210, and stores those models in the indirect access storage means 225 (S301). Then the calculation model is copied to the direct access storage means 224, and the processing path data generation unit 2211 generates the processing path of the tool 103 that processes the work 102 with the NC processing machine 240 based on the positional and attitudinal relationship among the calculation models of the NC processing machine, the tool and the work. The resultant data are stored in the indirect access storage means 225 (S302).

The processing path data stored in the indirect access storage means 225 are directly copied to the direct access storage means 224 so that at least one arbitrary point on the processing path is set for calculation of the interference state to check whether the portion of the tool 103 other than the processing part interferes with the work 102 set in the NC processing machine 240, and the portion 101 of the NC processing machine 240 around the part for holding the tool and the work interferes with the work 102 (S303). At least one calculation model of the work, and at least one calculation model of the tool such as the industrial tool and the NC processing machine for the interference calculation are selected (S304).

The point on the processing path for the interference calculation is selected (S305). If there is no point to be selected, it is determined that all the processing has been finished (S306). The position and posture of the work and the tool at the point is calculated (S307). Then one of the plurality of works is selected (S308). If there is no work to be selected, the process proceeds to step S313 (S309). If the work to be selected exists, the process proceeds to the next step where one tool is selected from a plurality of tools (S310). If there is no tool to be selected, the process returns to step 308 (S311).

Then the closest distance/direction calculation unit 2212 obtains the closest contact point between the selected work and the tool, and the distance therebetween and the direction from a tool reference point. The data of the distance and the direction are stored in the data storage region 226 with respect to the closest distance and the direction between the tool and the work as shown in FIG. 2A (S312).

The process steps from 308 to 312 are repeatedly executed with respect to combinations of all the works and all the tools in accordance with the positional and attitudinal relationship therebetween at the point on the processing path selected in step 305. Then the combination of the tool and the work at the closest distance is selected from those stored in the data storage region 226 with respect to the closest distance between the tool and the work, and the direction as shown in FIG. 3 (S313).

The closest distance/direction color setting unit 2213 determines the color in accordance with the distance and direction of the extracted combined tool and the work at the closest distance in reference to the data table 227 for determining the display color in accordance with the distance and direction (S314). The color is displayed on the display means 222 as the one at the point on the processing path (S315).

Thereafter, the process returns to S305 where the same process is executed until no point is left to be selected, that is, the process ends at all the points on the processing path in S306. This makes it possible to identify the closest distance and direction between the work 102 and the tool 103, and the direction at all the points on the processing path as colors on the processing path. In other words, the display means 222 of the CAM device 220 allows easy identification of the clearance between the work and the tool over the entire processing region in a panoramic manner based on change of the color.

The tool/work relationship correction unit 2214 executes processing using the information displayed on the display means 222 based on the data input from the input means 223 (for example, the data displayed on the display means 222 are corrected and input by the input means 223 of interactive type). The result is displayed on the display means 222 again so as to allow appropriate design of the processing path while adjusting the posture and the passage of the tool 103 as needed (S316). Upon completion of adjustment of the posture and path of the tool 103, those data are transmitted to the NC program generation device 230. The processing means 231 allows the NC processing machine 240 to generate the NC program for processing the work 102 (S317). Upon completion of NC program generation, a series of operations ends.

Figure 4:
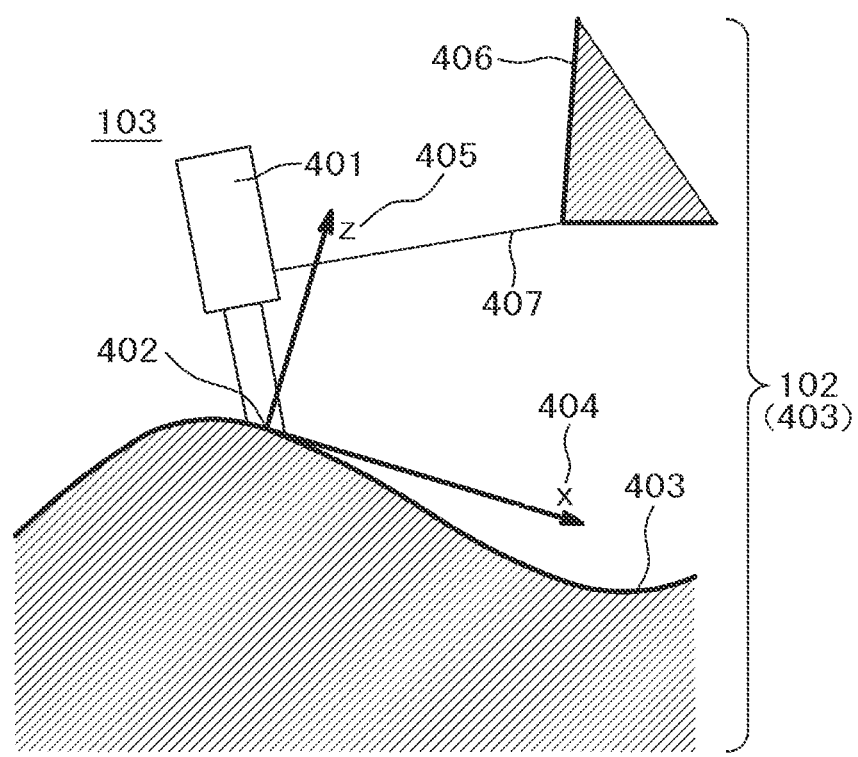
FIG. 4 is a sectional view illustrating a relationship between parts of the tool and the work.

FIG. 4 schematically shows a relationship between a part 401 of the tool 103 and a part 406 of the work 102 (403) in the process steps S313 and S314 as described referring to FIG. 3. The part 401 of the tool 103 is in contact with the work 403 at a contact point 402 between the tool 103 and the work 102 (403). Supposing that the advancing direction of the part 401 of the tool 103 is set to an X-direction 404 at the contact point 402, and the normal direction of the work at the contact point 402 is set to a Z-direction 405, the three-dimensional coordinate system having the contact point 402 as the original point may be defined. When the part 401 of the tool 103 is operated to process the work along the processing path, it needs to execute the processing while avoiding the interference with the other part 406 of the work 403. The closest distance between the part 401 of the tool 103 and the part 406 of the work 403, and the direction 407 have to be constantly identified, and the processing path has to be adjusted as needed in accordance with the identified state.

The structure according to the embodiment intended to solve the aforementioned problem converts the information on the closest distance and the direction 407 into color. The color is displayed on the display means 222 of the CAM device 220 as the color corresponding to the contact point 402. This allows an operator to identify the interference state as needed, and further identify the processing path as needed based on the state.

Figure 5:
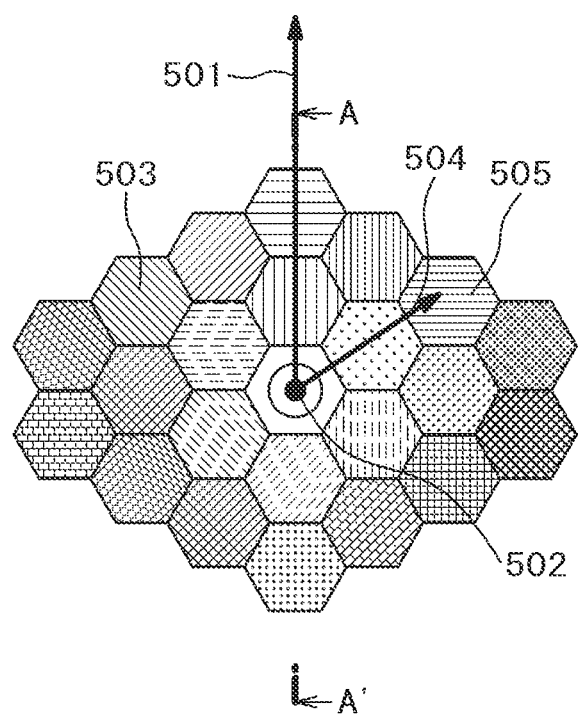
FIG. 5 is a view showing a result of conversion of information on the closest distance and direction into colors.

FIG. 5 graphically shows the process for converting the information on the closest distance and the direction 407 shown in FIG. 4, which is executed in steps S313 and S314 of the process shown in FIG. 3. An x-axis 501 corresponds to the x-axis 404 shown in FIG. 4, and a z-axis 502 in the vertical direction with respect to the drawing corresponds to the z-axis 405 shown in FIG. 4. The view of FIG. 5 seen from the plane A-A' corresponds to the view shown in FIG. 4. In the three-dimensional coordinate system defined by the x-axis 501 and the z-axis 502, a pattern 503 to which a color is arranged in accordance with the distance and direction from the original point in an xy-plane that contains the x-axis 501 is set and stored in the data table 227 for determining the display color in accordance with the distance and direction of the indirect access storage means 225 of the CAM device 220. A line 504 formed by projecting the closest distance and the direction 407 shown in FIG. 4 to the xy-plane is drawn in reference to the data table 227. A color 505 pointed by the tip of the line is set as the color of the original point of the coordinate system.

The color pattern 503 may have its color or brightness changed, or different textures arranged. The color pattern 503 does not have to be arranged on the contact point 402 shown in FIG. 4, but may be evaluated at an arbitrary part of the tool. The closest distance and the direction 407 are projected to draw the line 504 in accordance with the position and posture of the arranged color pattern 503 so as to determine the representative color.

Figure 6:
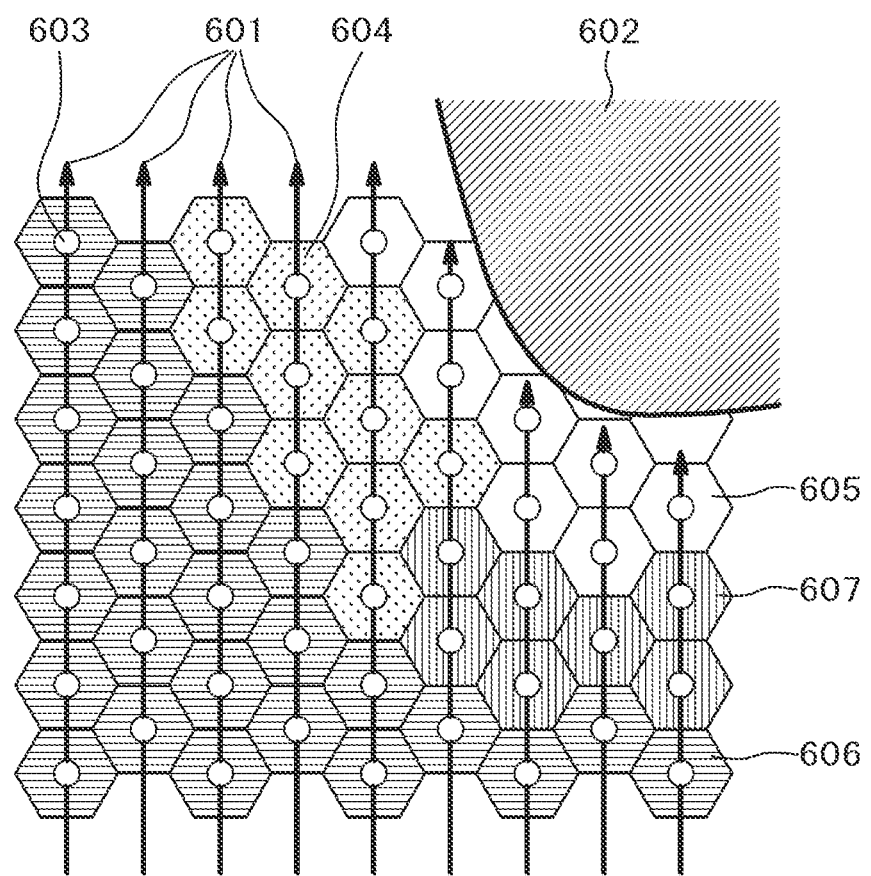
FIG. 6 is a view showing a result of arranging colors calculated with respect to points on the tool path.

FIG. 6 shows a result of the respective points on the tool path to which colors are imparted through the interference check of the processing path using the method as described referring to FIGS. 4 and 5. A plurality of arrow marks 601 represent rows of the generated processing paths. If an obstacle 602 exists on the tool path, an algorithm according to the present invention as described referring to FIGS. 3, 4 and 5 is executed at the representative points 603 on the tool paths illustrated as white circles. Mapping is conducted on the processing surface by imparting the selected colors to hexagons 604 with the corresponding representative points each as the center. As the color is selected through calculation of the closest distance between the tool and the obstacle 602 with respect to the representative point 603 on each of the tool paths, the color imparted to the representative point 605 close to the obstacle 602 is different from the color imparted to the representative point 606 far from the obstacle. The panoramic view of the processing surface provides a macroscopic color pattern.

FIG. 6 illustrates a pattern that includes the closest region as a group to which the color of the representative point 605 is imparted, a region as a group to which the color of the representative point 604 is imparted, a region as a group to which the color of the representative point 607 is imparted, and a region as a group to which the color of the representative point 606 is imparted. This pattern easily allows visual identification of the clearance between the tool and the work as to which part on the processing surface, which direction with respect to the tool, and what extent. Based on the information, the posture of the tool and the processing path are adjusted as needed to allow generation of the processing path that establishes short processing period for a short period of time.

Figure 7:
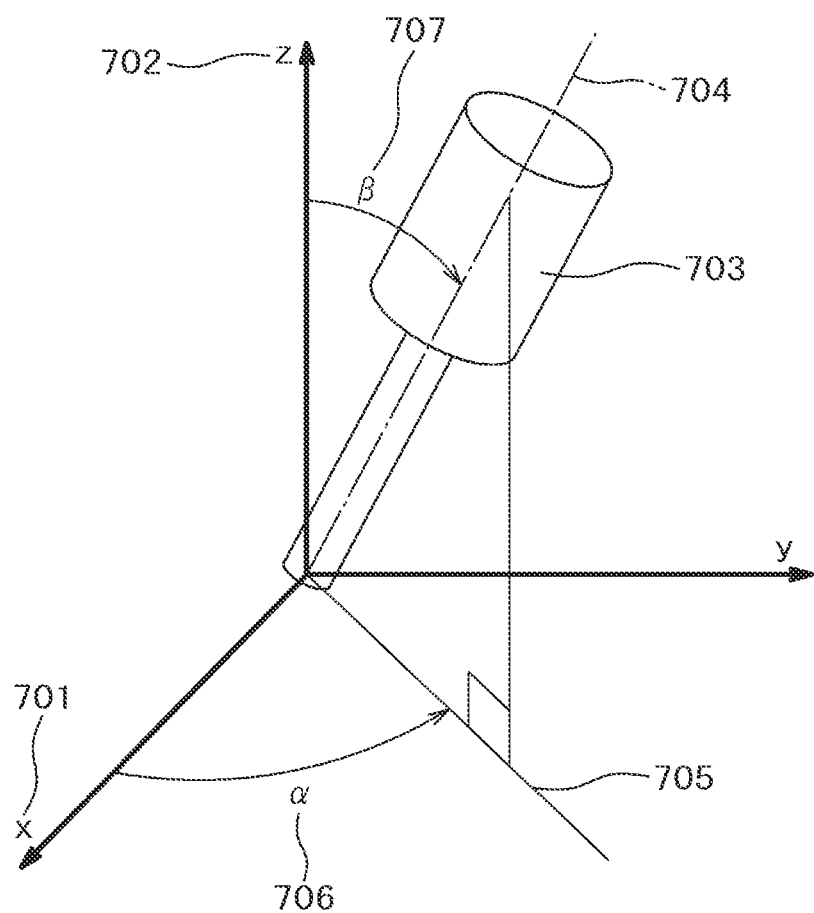
FIG. 7 is a view for setting a posture of the tool by two angles (α, β) in three-dimensional coordinate system while setting a contact point between the tool and the work to an original point.

FIG. 7 is an explanatory view representing the three-dimensional coordinate system with the contact point 402 as the original point and the posture of the tool 703 (103) when the advancing direction of the part 401 of the tool 103 at the contact point 402 shown in FIG. 4 is set to the x-direction 404 and the normal direction of the work 403 at the contact point 402 is set to the Z-direction 405. An x-axis 701 of the three-dimensional system shown in FIG. 7 corresponds to the X 404 shown in FIG. 4, and a z-axis 702 corresponds to the Z 405 shown in FIG. 4.

A relationship between a representative line 704 indicating the posture of the tool 703 and the coordinate system may be represented by an angle α 706 defined by an auxiliary line 705 formed by projecting the representative line 704 to an xy-plane of the coordinate system and the x-axis 701, and an angle β 707 defined by the representative line 704 and the Z-axis 702 in the plane formed by the z-axis 702 and the auxiliary line 705. For example, the posture of the tool with respect to the processing surface has to be preliminarily determined for generation of the rows 601 of the processing path shown in FIG. 6. The posture of the tool may be determined by setting the angles (α, β) as shown in FIG. 7.

Figure 8:
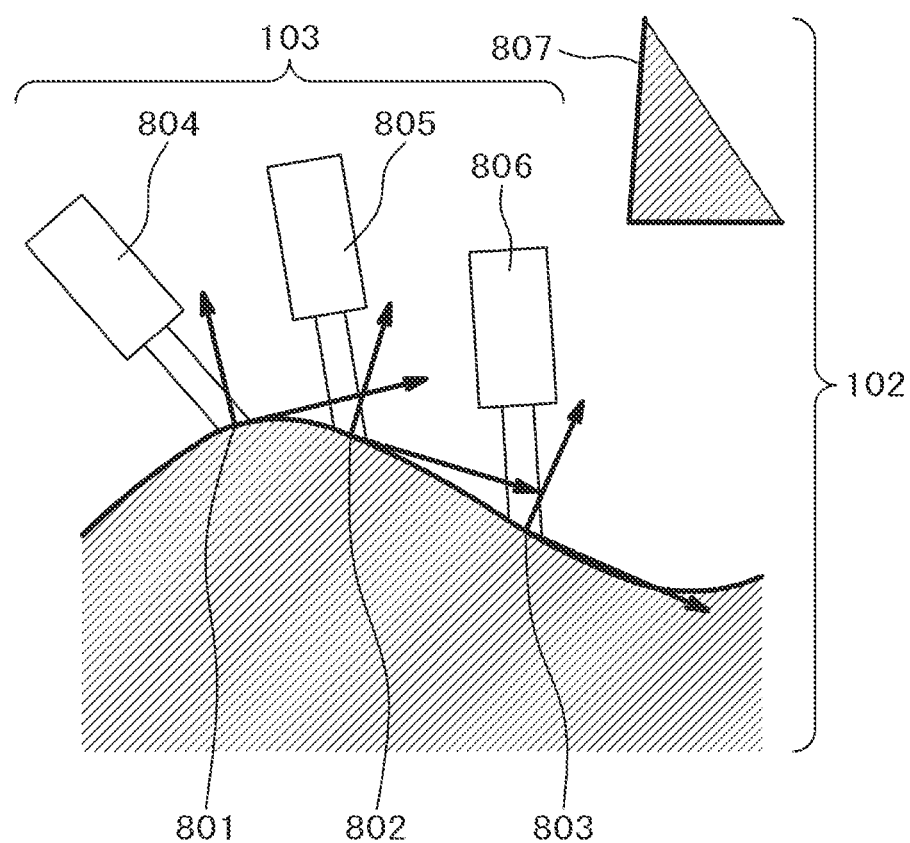
FIG. 8 is a sectional view showing a relationship between the tool and the work during processing when the posture to the processing surface is set by two angles (α, β).

FIG. 8 shows the state of the tool 103 during the processing when setting the posture to the processing surface by two angles (α, β) shown in FIG. 7. Referring to FIG. 7, the angles (α, β) are determined in the three-dimensional system defined on the processing surface. The posture of the tool 103 shown in FIG. 8 changes as 804, 805 and 806 in FIG. 8 show accompanied with movement of the contact point as 801, 802 and 803 show for the purpose of keeping a constant posture with respect to the normal line of the respective contact points for the processing. From a view fixed to the drawing, the tool 103 seems to swing. The posture 804 of the tool 103 at a contact point 801 is directed away from an obstacle 807 in the clearance between the obstacle 807 and the tool 103 on the tool path. Meanwhile, the posture 806 of the tool 103 at the contact point 803 is sharply brought to be close to the obstacle 807, which increasingly causes the risk of collision between the tool 103 and the work 102. This embodiment easily allows visual identification of the aforementioned state as to which part of the work 102 on the processing surface, which direction with respect to the tool 103, and what extent so as to adjust the posture of the tool as needed.

Figure 9:
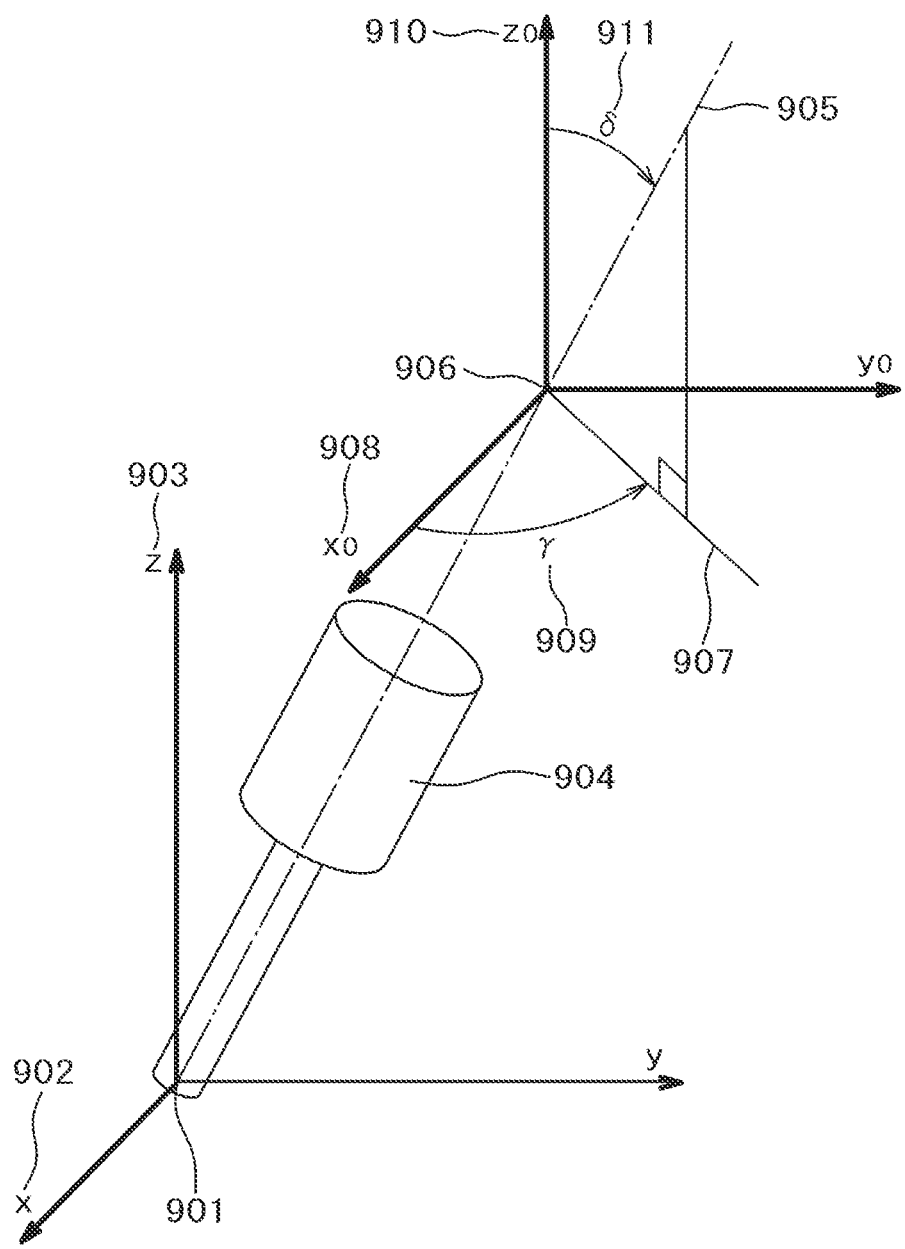
FIG. 9 is a view showing the posture of the tool set by two angles (γ, δ) in the fixed three-dimensional coordinate system.

FIG. 9 is an explanatory view of a method different from the tool posture determination method as described referring to FIG. 7. The three-dimensional system has the contact point 402 shown in FIG. 4 as the original point corresponding to an original point 901 shown in FIG. 9, the x-axis 404 shown in FIG. 4 corresponding to an x-axis 902, and the z-axis 405 shown in FIG. 4 corresponding to a z-axis 903. Referring to FIG. 9, unlike the xyz coordinate system, a fixed coordinate which does not influence the posture of the tool 904 with respect to the work 102 is defined for the purpose of defining the posture of the tool 904. In other words, the posture of the tool 904 is defined in the fixed coordinate with a point 906 as the original point on a representative line 905 indicating the posture of the tool 904. The representative line 905 may be expressed by an angle γ 909 defined by an auxiliary line 907 formed by projecting the representative line 905 to an x0y0 plane in the fixed coordinate system and an x0-axis 908, and an angle δ 911 defined by the representative line 905 and a z0-axis 910 in a plane formed by the z0-axis 910 and the auxiliary line 907. For example, the posture may be determined by the angles (γ, δ) shown in FIG. 9 for generation of the rows 601 on the processing paths shown in FIG. 6.

Figure 10:
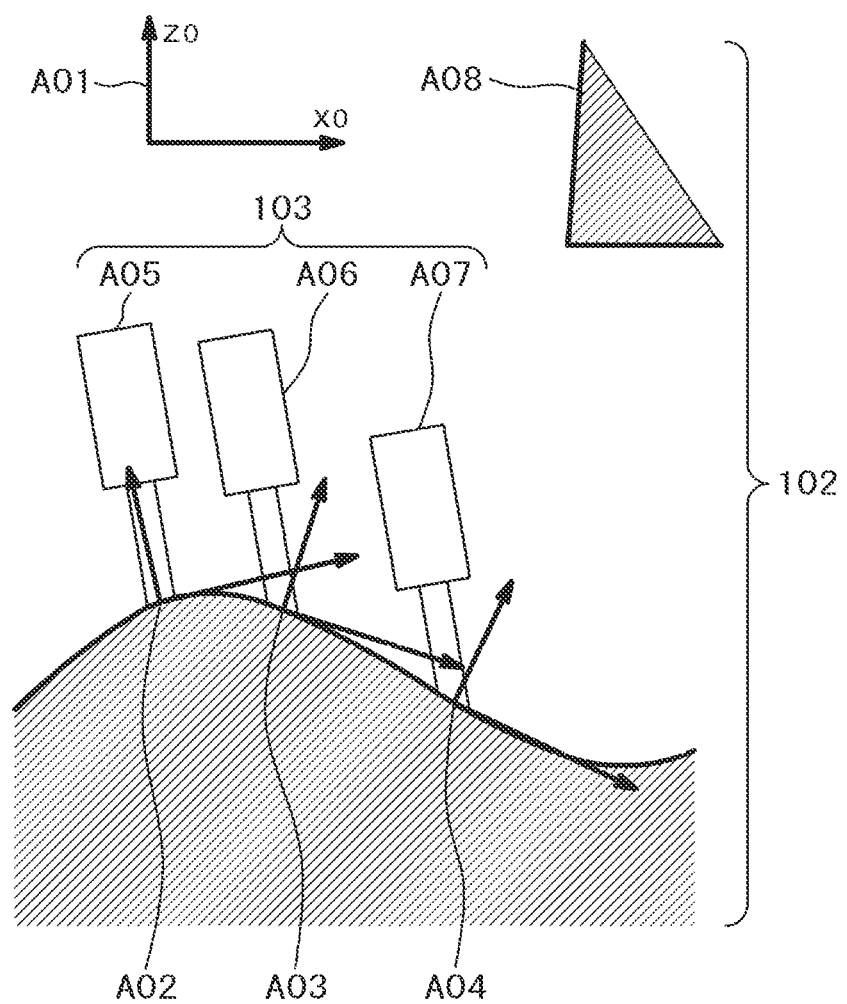
FIG. 10 is a sectional view showing a relationship between the tool and the work during processing when setting the posture to the processing surface by two angles (γ, δ).

FIG. 10 shows the state of the tool 103 during the processing when setting the posture to the processing surface by two angles (γ, δ) as described referring to FIG. 9. The angles (γ, δ) are determined in the fixed coordinate system A01 as shown in FIG. 9. Referring to FIG. 10, the tool 103 has its posture changed as shown by A05, A06 and A07 accompanied with movement of the contact point with the work 102 as shown by A02, A03 and A04 for the purpose of processing at a constant posture with respect to the fixed coordinate system A01. From the view fixed to the drawing, the tool seems to always keep the posture constant. In order to perform the processing by keeping the posture, the rake angle of the blade edge has to be kept constant by correcting the contact point between the blade edge of the tool and the work as needed. However, this may provide the advantage that the clearance between an obstacle A08 and the tool 103 on the tool path does not sharply bring the tool to be close to the work when the contact point moves from A02 to A04 as shown in FIG. 8. The aforementioned state is displayed on the display means 222 in different colors to easily allow visual identification of the state as to which part of the processing surface, which direction with respect to the tool 103 and what extent. This makes it possible to adjust the posture of the tool as needed.

Figure 11:
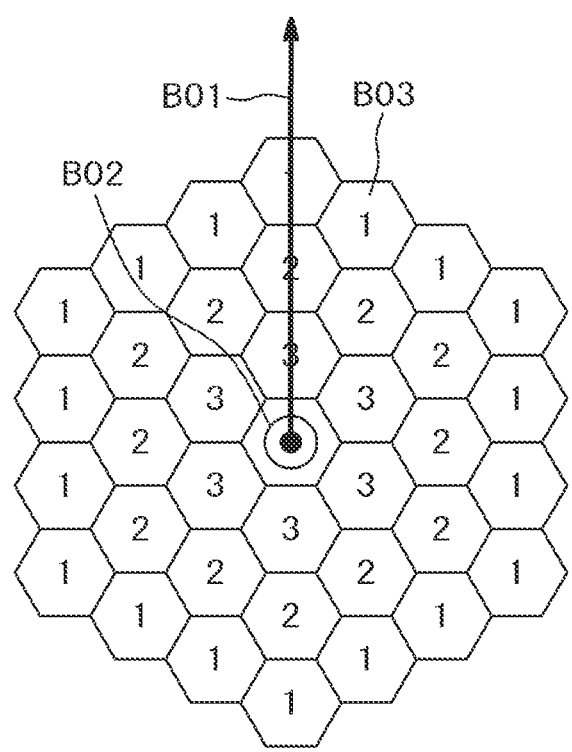
FIG. 11 is a score map that replaces the color pattern.

FIG. 11 is a view formed by replacing the color pattern 503 shown in FIG. 5 with scores. An x-axis B01 corresponds to the x-axis 404 shown in FIG. 4, and a z-axis B02 vertically directed with respect to the drawing corresponds to the z-axis 405 shown in FIG. 4. In the three-dimensional coordinate system defined by the x-axis B01 and the z-axis B02, a pattern B03 of the score obtained by the distance and direction from the original point in the xy-plane that contains the x-axis B01 is set. Referring to FIG. 11, the score becomes higher as it is closer to the original point of the coordinate system. The score pattern B03 is expressed by positive integer in FIG. 11. However, the pattern may be expressed by negative integer or real number. Referring to FIG. 11, the pattern is set so that the same scores are concentrically arranged with respect to the original point of the coordinate system. The coordinate system defined by the tool feeding direction and the normal line of the processing surface is directed from front to back and from side to side, and accordingly, positive and negative scores may be arranged at the right and left sides, respectively, or scores may be weighted with respect to the direction.

Figure 12:
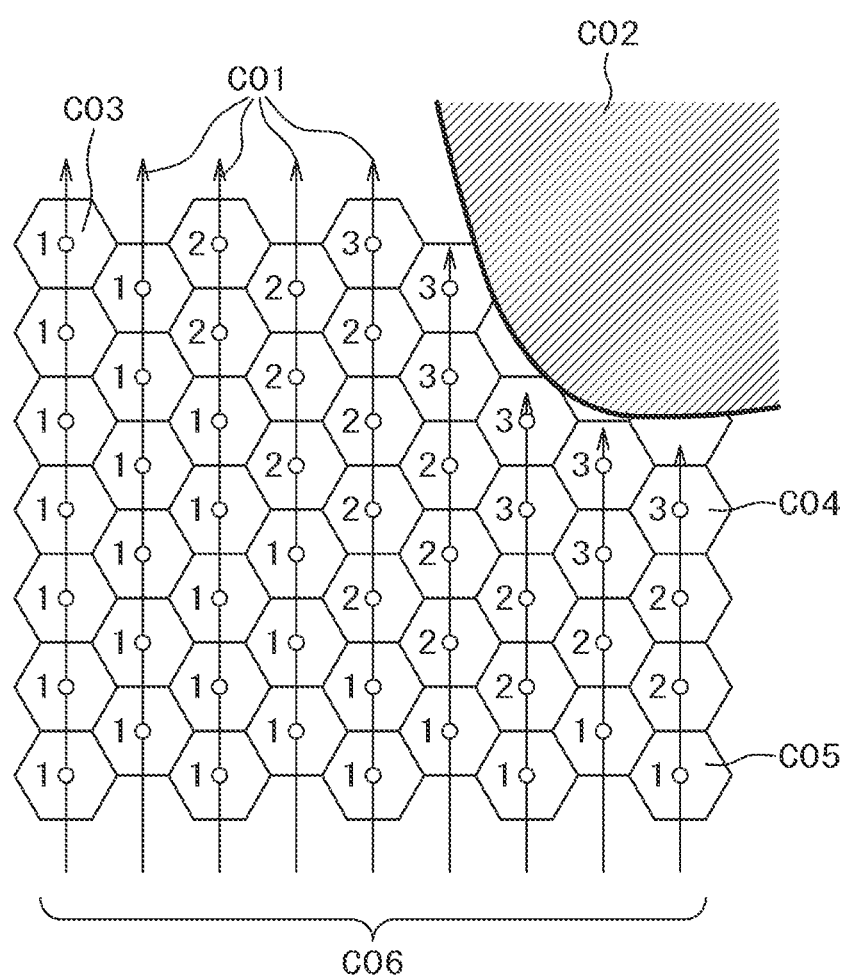
FIG. 12 shows a result of scoring the respective points on the tool path using the score pattern.

FIG. 12 shows results of scoring the respective points on the tool path using the score pattern shown in FIG. 11. A plurality of arrow marks C01 represent rows of the generated processing paths. In the state where an obstacle C02 exists on the tool path, representative points C03 on the tool paths are scored using the score pattern B03 described referring to FIG. 11. As the closest distance between the tool and the obstacle C02 is calculated in reference to the representative point C03 on the tool path, the score at a representative point C04 close to the obstacle C02 is different from the one at a representative point C05 distant from the obstacle C02. The sum of the scores obtained for all the C06 on the processing path allows comparison among scores of the generated processing path groups from the viewpoint of the clearance between the tool 103 and the work 102.

Figure 13:
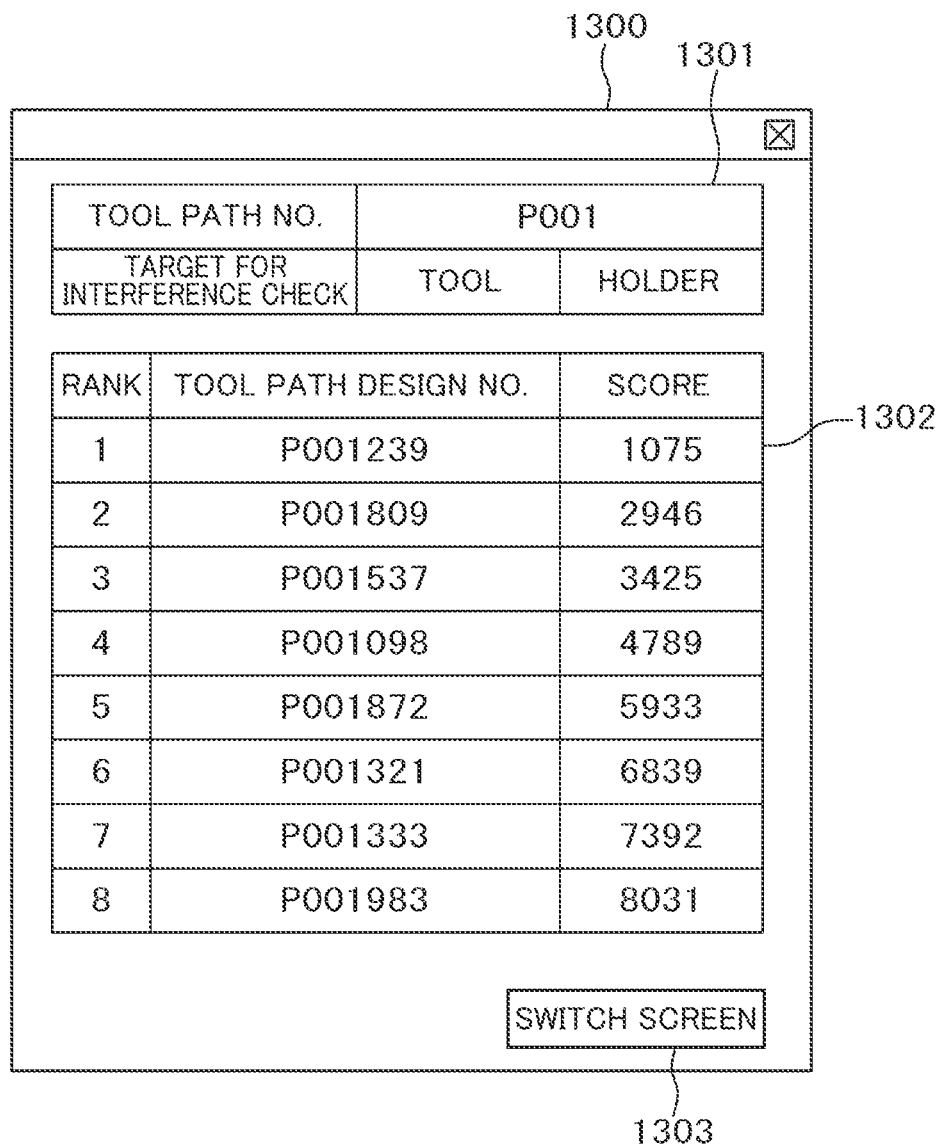
FIG. 13 is a front view of the screen showing calculated scores of a plurality of patterns of processing directions of the work and the tool postures which have been changed for the respective processing path groups in the form of a table.

FIG. 13 shows an example of a screen 1300 representing comparison among score results of the generated processing path groups from the viewpoint of clearance between the tool and the work as described referring to FIG. 12. Referring to FIGS. 11 and 12, the score is lowered as the clearance becomes larger. As the sum of values for all the processing paths becomes smaller, the score is considered as higher. Several patterns of combination of the work processing direction and the tool posture are prepared so that the respective scores of the processing path groups are calculated according to the present invention and listed as shown in FIG. 13.

Referring to FIG. 13, the tool path pattern classified by the work processing direction and the processing pitch is defined as a tool path No. and displayed on a display section 1301. Several patterns of the tool posture combination are defined as tool path design Nos., and respective scores are obtained and displayed on a display section 1302. Referring to FIG. 13, the strategy with respect to how well the spatial processing surface is processed by the tool for the respective patterns may be compared among those based on scalar quantity, that is, score. When clicking a switch screen button 1303, the next screen shown in FIG. 14 is displayed.

Figure 14:
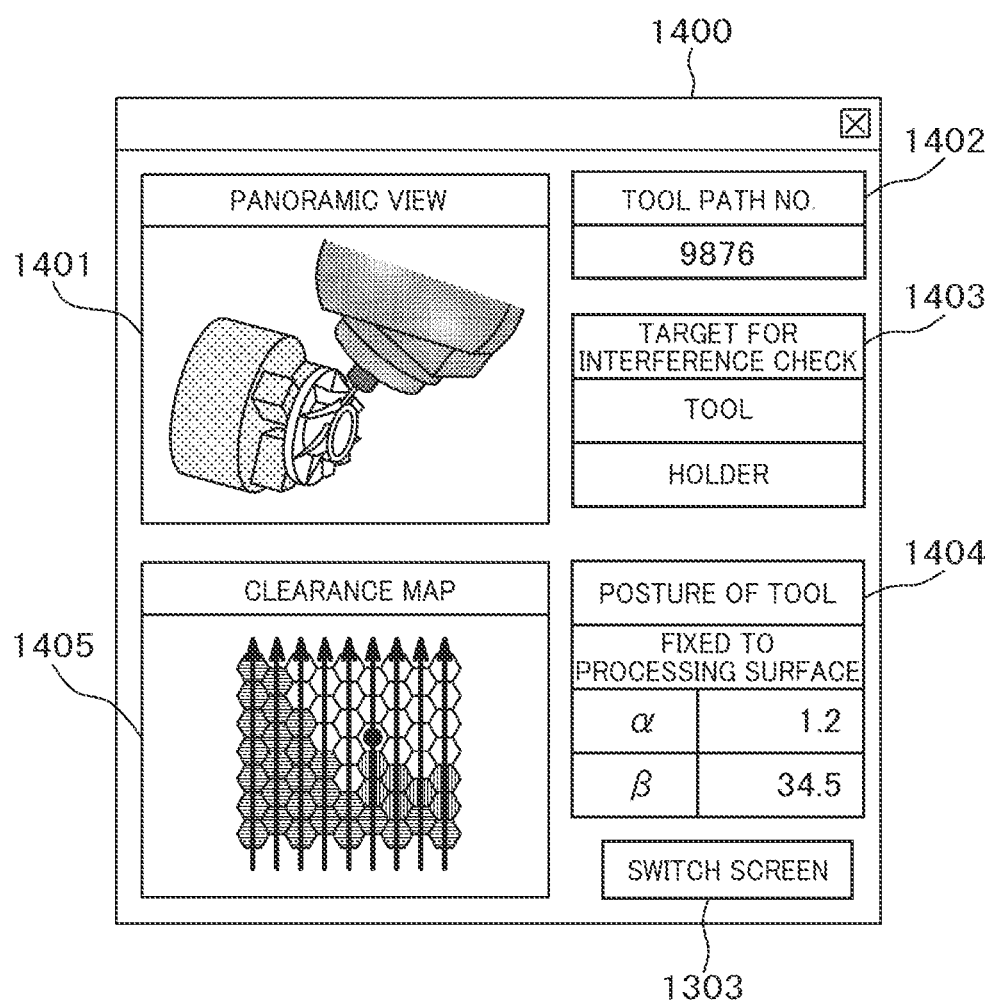
FIG. 14 is a front view of the screen of an output display, which includes a general panoramic view illustrating the positional and attitudinal relationship between the tool and the work, a processing path number display portion, an interference check target display portion, a tool posture display portion and a clearance map display portion.

FIG. 14 shows an example of a screen 1400 displayed upon execution of the present invention on the CAM device. Referring to the exemplary screen, a positional and attitudinal relationship between the tool and the work is shown as a whole panoramic view 1401. A tool path No. 1402 and an interference check target 1403 are input. The tool posture is determined by two angles ($\alpha$, $\beta$) using the coordinate system fixed to the processing surface as shown in FIGS. 7 and 8, and displayed on a tool posture display section 1404. Based on the input information, the clearance between the tool and the work along the processing path is calculated through the method according to the present invention, and the result is displayed as a clearance map 1405. This screen easily allows visual identification of the clearance between the tool and the work as to which direction with respect to the tool, and what extent during the processing with the tool posture determined to the tool path. This makes it possible to adjust the tool posture as needed.

Upon designating a new path No. on the path No. designation column 1402, the whole panoramic view display section 1401 and the clearance map display section 1405 are switched in accordance with the designated path No. for display. When changing the interference check target on the interference check target designation section 1403, the whole panoramic view display section 1401 and the clearance map display section 1405 are also switched in accordance with the designated interference check target.

The clearance map display section 1405 shown in FIG. 14 corresponds to the embodiment shown in FIG. 6. However, it may be displayed using numerical values as described referring to FIG. 12.

When clicking the switch screen button 1303, the screen shown in FIG. 13 is displayed.

INDUSTRIAL AVAILABILITY

The present invention is applied to technical field of CAM (Computer Aided Manufacturing) for interference check evaluation of the device, the tool and the work upon generation of a tool path for the purpose of performing processing using the CNC (numerical controller).

REFERENCE SIGNS LIST

101 . . . 5-axis CNC machining device
102 . . . Impeller
103 . . . Tool
210 . . . CAD device
211 . . . Processing device
212 . . . Display device
213 . . . Input device
214 . . . Direct access storage device
215 . . . Indirect access storage device
220 . . . CAM device
221 . . . Processing device
222 . . . Display device
223 . . . Input device
224 . . . Direct access storage device
225 . . . Indirect access storage device
227 . . . Data table for determination of display color by distance and direction
230 . . . NC program generation device
231 . . . Processing device
232 . . . Display device
233 . . . Input device
234 . . . Direct access storage device
235 . . . Indirect access storage device
240 . . . NC processing machine
401 . . . Part of tool
403 . . . Work
601 . . . Row of generated processing path
602 . . . Obstacle on tool path
603 . . . Representative point on tool path
604 . . . Hexagon with representative point as center
703, 904 . . . Tool 1300, 1400 . . . Display screen
A08 . . . Obstacle on tool path
C01 . . . Row of generated processing path
C02 . . . Obstacle on tool path
C06 . . . Whole processing path

The invention claimed is:

1. A processing path generation device that generates a path of a tool by calculating a positional and attitudinal relationship between a device of an NC processing machine and the tool, and a work through simulation executed by a computer, comprising:
   closest distance calculation unit that calculates a closest distance between the tool and the work at a plurality of arbitrary points on the tool path, wherein the closest distance calculation unit awards a score to each of the plurality of arbitrary points in accordance with a distance and direction of the work from the tool based on a result of the calculation;
   color or texture imparting unit that imparts one or more different colors or one or more different textures to each of the plurality of arbitrary points in accordance with the plurality of scores calculated by the closest distance calculation means; and
   display unit that displays the color or the texture imparted by the color/texture imparting unit on a screen as the color or the texture at each of the plurality of arbitrary points on the tool path.

2. The processing path generation device according to claim 1, further comprising:
   an input unit that inputs information used for correcting the path or a posture of the tool on the screen of the display unit on which the color or the texture at each of the plurality of points on the tool path is displayed; and
   a data correction unit that corrects the path or the posture of the tool based on the information input from the input unit, and displays a result of a recalculation of the scores for each of the plurality of points on the tool path, which is performed by the closest distance calculation unit again on the screen of the display unit.

3. The processing path generation device according to claim 2, further comprising NC program generation device that allows the NC processing machine to generate an NC program for processing of the work based on a defect that has been corrected by the data correction unit.

4. The processing path generation device according to claim 1, wherein: the tool formed as a device of the NC processing machine includes a holder of the tool, a holding device of the work, and a part of the processing machine around the work; and the work comprises a larger processing region.

5. The processing path generation device according to claim 1, wherein the color or texture imparting unit imparts a specific color with brightness that differs in accordance with the distance and the direction of the work from the tool.

6. A processing path generation method that generates a path of a tool by calculating a positional and attitudinal relationship between a device of an NC processing machine and the tool, and a work through simulation executed by a computer, comprising:
   calculating a closest distance between the tool and the work at a plurality of arbitrary points on the tool path;
   awarding a score to each of the plurality of arbitrary points in accordance with a distance and direction of the work from the tool based on a result of the calculation;
   imparting one or more different colors or one or more different textures to each of the plurality of arbitrary points in accordance with the plurality of scores; and
   displaying the imparted color or the imparted texture on a screen as the color or the texture at each of the plurality of arbitrary points on the tool path.

7. The processing path generation method according to claim 6, further comprising:
   inputting information used for correcting the path or a posture of the tool on the screen on which the color or the texture at each of the plurality of points on the tool path is displayed; and
   correcting the path or the posture of the tool based on the input information, and recalculating the closest distance between the tool and the work;
   awarding the scores to each of the plurality of arbitrary points based on the recalculation; and
   displaying a result of the recalculated closest distance on the screen again.

8. The processing path generation method according to claim 7, wherein the NC processing machine is allowed to generate an NC program for processing the work based on data of the recalculated closest distance displayed on the screen again.

9. The processing path generation method according to claim 6, wherein: the tool formed as a device of the NC processing machine includes a holder of the tool, a holding device of the work, and a part of the processing machine around the work; and the work comprises a larger processing region.

10. The processing path generation method according to claim 6, wherein imparting of the color or the texture is performed by imparting a specific color with brightness that differs in accordance with the distance and the direction of the work from the tool.

* * * * *